(12) United States Patent
Levy

(10) Patent No.: US 6,493,676 B1
(45) Date of Patent: Dec. 10, 2002

(54) SYSTEM AND METHOD FOR CHARGING FOR VEHICLE PARKING

(76) Inventor: Nessim Igal Levy, 13 Habrosh Street, Savyon 56915 (IL)

( * ) Notice: Subject to any disclaimer, the term of this patent is extended or adjusted under 35 U.S.C. 154(b) by 0 days.

(21) Appl. No.: 09/270,514

(22) Filed: Mar. 17, 1999

(30) Foreign Application Priority Data

Apr. 20, 1998 (IL) ................................................ 124133

(51) Int. Cl.$^7$ ............................................... G06F 17/60
(52) U.S. Cl. ......................... 705/13; 705/417; 705/418
(58) Field of Search ........................... 705/13, 417, 418

(56) References Cited

U.S. PATENT DOCUMENTS

| | | | | |
|---|---|---|---|---|
| 5,166,680 A | * | 11/1992 | Ganot | 340/932.2 |
| 5,351,187 A | * | 9/1994 | Hassett | 364/401 |
| 5,459,304 A | * | 10/1995 | Eisenmann | 235/380 |
| 5,490,079 A | * | 2/1996 | Sharpe et al. | 364/467 |
| 5,648,906 A | * | 7/1997 | Amirpanahi | 364/464.28 |
| 5,721,678 A | * | 2/1998 | Widl | 34/424.04 |
| 5,910,782 A | * | 6/1999 | Schmitt et al. | 340/995 |
| 5,919,239 A | * | 7/1999 | Fraker et al. | 701/35 |
| 5,920,057 A | * | 7/1999 | Sonderegger et al. | 235/384 |
| 5,940,481 A | * | 8/1999 | Zeitman | 379/114 |
| 5,991,749 A | * | 11/1999 | Morrill, Jr. | 705/44 |
| 6,073,075 A | * | 6/2000 | Kondou et al. | 701/203 |

FOREIGN PATENT DOCUMENTS

| | | | |
|---|---|---|---|
| DE | 43 44 433 A1 | 7/1995 | |
| DE | 196 05 464 A1 | 8/1997 | |
| EP | 0 466 314 A3 | 1/1992 | |
| EP | 959436 A1 * | 11/1999 | G07C/1/30 |
| WO | WO 95/08162 | 3/1995 | |
| WO | WO 97/13222 | 4/1997 | |
| WO | WO-200046068 A1 * | 8/2000 | B60Q/1/48 |

OTHER PUBLICATIONS

Hildebrant, "Vehicle Location System," http://www.invention.com/hildebrant, downloaded from internet Mar. 27, 2002, 5 pages.*

* cited by examiner

Primary Examiner—Kyle J. Choi
Assistant Examiner—Marc Norman
(74) Attorney, Agent, or Firm—Eitan, Pearl, Latzer & Cohen-Zedek

(57) ABSTRACT

A system and method for charging for vehicle parking is provided. The parking system includes a plurality of mobile parking units, each of the mobile parking units having an unique identification for installation in a vehicle and a parking control center for communicating with each of the mobile parking units. Each of the mobile parking units checks its location whenever the vehicle is not moving and if the location coincides with a known parking area, a charge for parking is activated until the vehicle resumes traveling.

56 Claims, 5 Drawing Sheets

SYSTEM AND METHOD FOR CHARGING FOR VEHICLE PARKING

FIELD OF THE INVENTION

The present invention relates to vehicle parking, and specifically to cash less parking and automatic parking toll collection.

BACKGROUND OF THE INVENTION

There are numerous systems used today for controlling and charging for parking.

Examples of parking control systems include parking meters adjacent parking bays requiring the insertion of coins as payment for specific parking periods, and centralized parking machines in which money is inserted and a ticket printed out by the parking machine for the period of time paid for. Alternatively, preprinted tickets or parking cards can be bought which the driver uses to indicate the date and time parking commenced or the parking period. These cards are usually displayed in the car window so that it can be seen by a parking inspector. Such tickets are usually limited for a specific number of minutes, such as 60 minutes. In certain locations, it may also be possible to use several tickets to park for a longer period.

Off-street parking generally requires payment to be made on entry or exit of a parking lot, either automatically monitored or manually supervised. Generally, off-street parking in private parking lots is supervised.

One of the main problems associated with paid parking is the abuse of the various systems by avoiding payment either by non-payment of parking for a longer period of time than paid for, thereby depriving the municipal authority responsible for town parking from revenue. One common system for monitoring parking is to use inspectors who are authorized to issue parking tickets or fines for non-compliance with parking regulations and other abuses of the system. The use of inspectors is expensive and though parking fines may be issued, there is no guarantee that they will be paid, thus requiring additional resources for collection of the fines.

The use of meters has a number of disadvantages. They are costly to manufacture and require installation into the pavement next to each parking space. They break down, can be broken into and the money accumulated stolen. Moreover it needs a special expensive and in some locations it is also dangerous to collect cash from each meter and carry it all over the city. From the driver's point of view, the main disadvantage of the parking meter is that he needs to have small change and if he leaves the parking space before the end of the time paid for, he has overpaid for the actual time used. On the other hand, if he is late returning to his car, he is endanger of being fined.

The centralized parking machine has the advantage of saving multiple meters, by using one parking machine for one parking lot. However, it also suffers from the other disadvantages of the individual parking meter, such as being vulnerable to break in. As in the case of parking meters, there is also the problem of under or over-paying.

The preprinted parking tickets is no doubt the least costly to the proprietor of the parking lots, mostly municipal authorities, as it does not need any expensive construction work. As in the other systems described above, there is also the problem of under or over-paying.

The proprietor of the parking lot, requiring the car owner to voluntarily purchase a ticket, can lose money in cases where drivers park and take the risk of getting a ticket and do not pay the parking toll.

SUMMARY OF THE PRESENT INVENTION

It is an object of the present invention to provide an improved system for vehicle parking charges which overcomes the limitations and disadvantages of prior art systems.

It is a further object of the present invention to provide a system which is automatic and accurately records the exact time parked and charges accordingly.

There is therefore provided, in accordance with a preferred embodiment of the present invention, a mobile parking unit and a parking system which includes a plurality of mobile parking units, each of the mobile parking units having an unique identification for installation in a vehicle and a parking control center for communicating with each of the mobile parking units. Each of the mobile parking units checks its location whenever the vehicle is not moving and if the location coincides with a known parking area, a charge for parking is activated until the vehicle resumes traveling.

Furthermore, in accordance with a preferred embodiment of the present invention, each of the mobile parking units includes a vehicle location device for determining the geographic location and speed of each of the mobile parking unit, a transceiver connected to a modem, for communicating with the mobile parking units and a computer unit for coupling to the vehicle location device and the transceiver.

In an alternative embodiment, in accordance with a preferred embodiment of the present invention, each of the mobile parking units includes a vehicle location device for determining the geographic location and speed of each of the mobile parking units, a computer unit for coupling to the vehicle location device and a smart card reader coupled to the central processor.

Furthermore, in accordance with a preferred embodiment of the present invention, the computer unit includes a central processor and a smart card reader coupled to the central processor.

Furthermore, in accordance with a preferred embodiment of the present invention, each of the mobile parking units includes an electronic map database containing at least the geographic location of parking spaces in at least one specific region of operation, a Geographic Information System (GIS) interpreter for interpreting the data within the electronic map database and means for calculating the cost of parking. The electronic map database contains data associated with each of the parking spaces.

Furthermore, in accordance with a preferred embodiment of the present invention, the cost of parking is determined by the calculating means in accordance with the geographic location of each of the mobile parking units and the time it is immobile.

Furthermore, in accordance with a preferred embodiment of the present invention, each of the mobile parking units further includes input and output channels connected to at least one of a group of control elements including the vehicle ignition switch, the vehicle doors and volume (space) sensor. In addition, each of the mobile parking units further includes an indication unit for displaying an indication that parking is being charged for. The mobile parking unit includes a non-volatile memory unit for storing a prepaid monetary value for parking.

Furthermore, in accordance with a preferred embodiment of the present invention, the vehicle location device includes a Global Positioning System (GPS) receiver having an antenna coupled thereto.

Furthermore, in accordance with a preferred embodiment of the present invention, the computer unit further includes input/output (I/O) channels coupled to the central processor, the input/output (I/O) channels having at least one sensing elements connected thereto. The sensing elements comprise at least one of a group of sensors connected to the vehicle ignition switch, the vehicle doors and the internal volume of the vehicle.

Furthermore, in accordance with a preferred embodiment of the present invention, the control center includes a control computer and a transceiver coupled to a modem, which is coupled to the control computer.

In addition, in accordance with a preferred embodiment of the present invention, the control center further includes an electronic map database containing at least the geographic location of parking spaces in at least one specific region of operation, a Geographic Information System (GIS) interpreter for interpreting the data within the electronic map database and a means for calculating the cost of parking.

Additionally, there is provided, in accordance with a preferred embodiment of the present invention, a method for charging for vehicle parking which includes the steps of:

recording the time and location whenever the vehicle is immobile; and if the location coincides with a known parking area, calculating the parking charges for the total period of time the vehicle remains immobile.

Furthermore, in accordance with a preferred embodiment of the present invention, the method further includes the step of displaying an indication that parking is being charged for. The method also includes the step of identifying the geographic location and speed of the vehicle.

Furthermore, in accordance with a preferred embodiment of the present invention, the method further includes the step of using a vehicle location device installed in the vehicle for determining the geographic location and speed of each of the vehicles.

Furthermore, in accordance with a preferred embodiment of the present invention, the step of recording the time of the vehicle's immobility further includes at least one of the steps of:

recording the time the vehicle's ignition is switched off;

recording the time the vehicle's doors are opened and closed; and recording the time the volume within the vehicle is disturbed.

Furthermore, in accordance with a preferred embodiment of the present invention, the step of calculating includes the step of:

comparing the geographic location with an electronic map database containing the location of parking spaces in the region of operation; and calculating the cost of parking for the geographic location according to the cost of parking per unit of the immobile time for the parking space.

The calculating step is performed by the mobile parking unit. The calculating step further includes the step of the mobile parking unit communicating the calculated charges to a remote control center. Alternatively, the calculating step further includes the step of the mobile parking unit communicating the location of the vehicle to the remote control center.

In another alternative embodiment, the calculating step further includes the steps of:

the mobile parking unit communicating the parking time and the location of the vehicle to the remote control center charges; and the remote control center calculates the parking charges.

In another alternative embodiment, the calculating step further includes the steps of:

the mobile parking unit communicating the parking time to the control center; and the control center comparing the geographic location with an electronic map database containing the location of parking spaces in the region of operation; and the control center calculating the cost of parking for the geographic location according to the cost of parking per unit of the immobile time for the parking space.

The remote control center bills the vehicle owner for the calculated parking charges.

Furthermore, in accordance with a preferred embodiment of the present invention, the method includes the step of the control center transmitting the prepaid monetary value to the non-volatile memory unit of the mobile parking unit.

Furthermore, in accordance with a preferred embodiment of the present invention, the mobile parking unit includes a card reader and a keyboard and includes the step of the vehicle owner using a credit or debit card in the card reader and entering the prepaid monetary value to be entered into the non-volatile memory unit by means of the keyboard.

Furthermore, in accordance with a preferred embodiment of the present invention, the method further includes the step of transferring the electronic map database to the mobile parking unit by any of a group of removable media including floppy disk, a PCMCIA card, CD-ROM and DVD-ROM. Alternatively, the control center transmitting the electronic map database to the mobile parking unit.

Furthermore, in accordance with a preferred embodiment of the present invention, the transmission includes the step of the vehicle user requesting the transmission or the mobile parking unit requests the transmission whenever the vehicle is immobile and is located within a region for which a map database is not stored.

BRIEF DESCRIPTION OF THE DRAWINGS

The present invention will be understood and appreciated more fully from the following detailed description taken in conjunction with the drawings in which.

DESCRIPTION OF THE INVENTION

Figure 1:
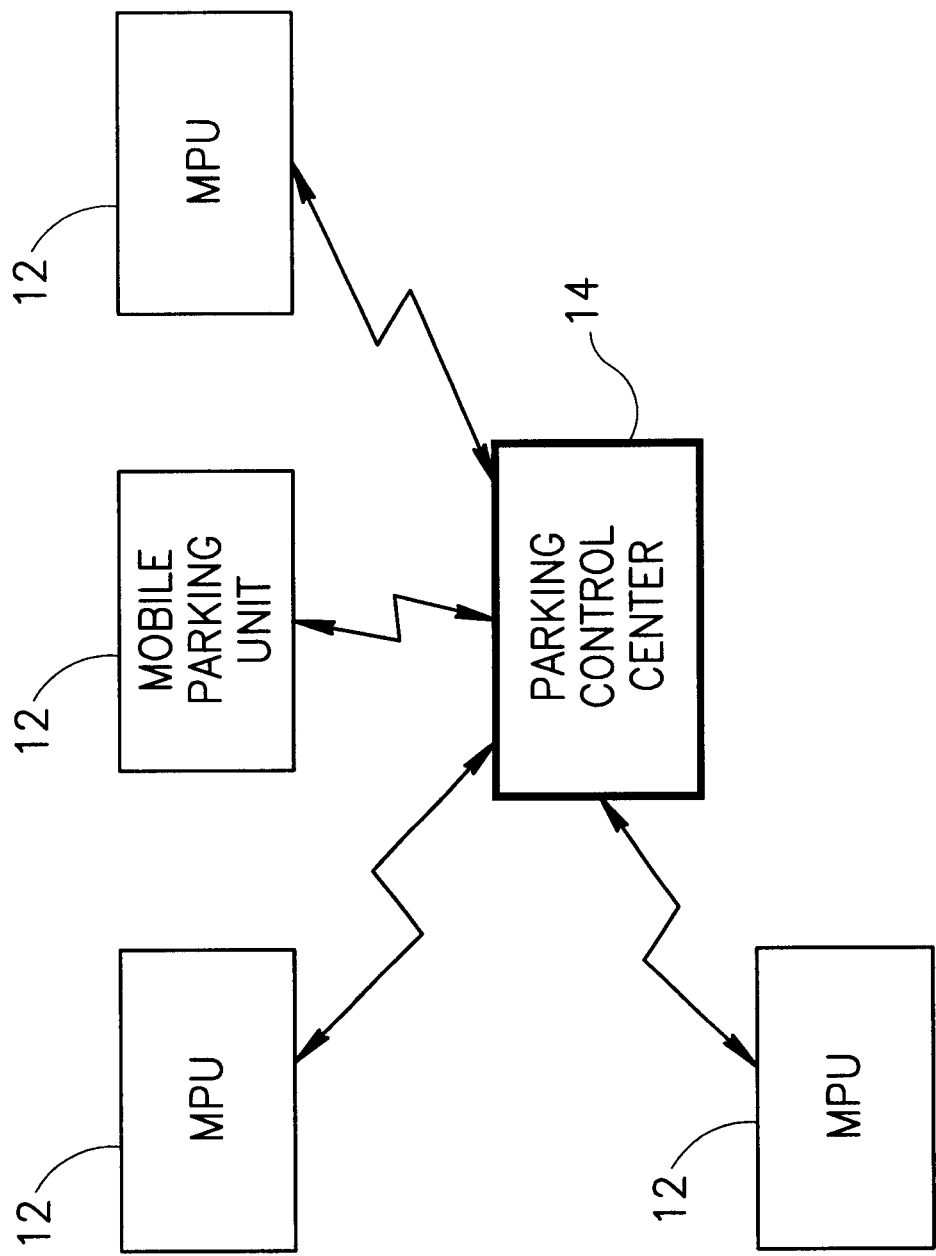
FIG. 1 is a schematic illustration of the parking system, constructed and operative in accordance with an embodiment of the present invention.

Reference is now made to FIG. 1 which is a schematic illustration of the system for charging for parking, generally indicated 10, constructed and operative in accordance with an embodiment of the present invention.

Parking charging system 10 comprises a plurality of mobile parking units 12, each of which is installed in a vehicle and a parking control center 14 for communicating with each mobile parking unit 12. Each mobile parking unit 12, which is assigned an unique identification number, checks its location whenever the vehicle is not moving and if the location coincides with a known parking area, charging for parking is activated. The parking charge is terminated when the vehicle resumes traveling. As will be described hereinbelow, the activation and termination of the parking charge may be initiated either by the parking control center 14 or by the mobile parking unit 12 itself.

In an alternative embodiment, the mobile parking unit 12 can be used as a stand-alone independent unit.

Figure 2:
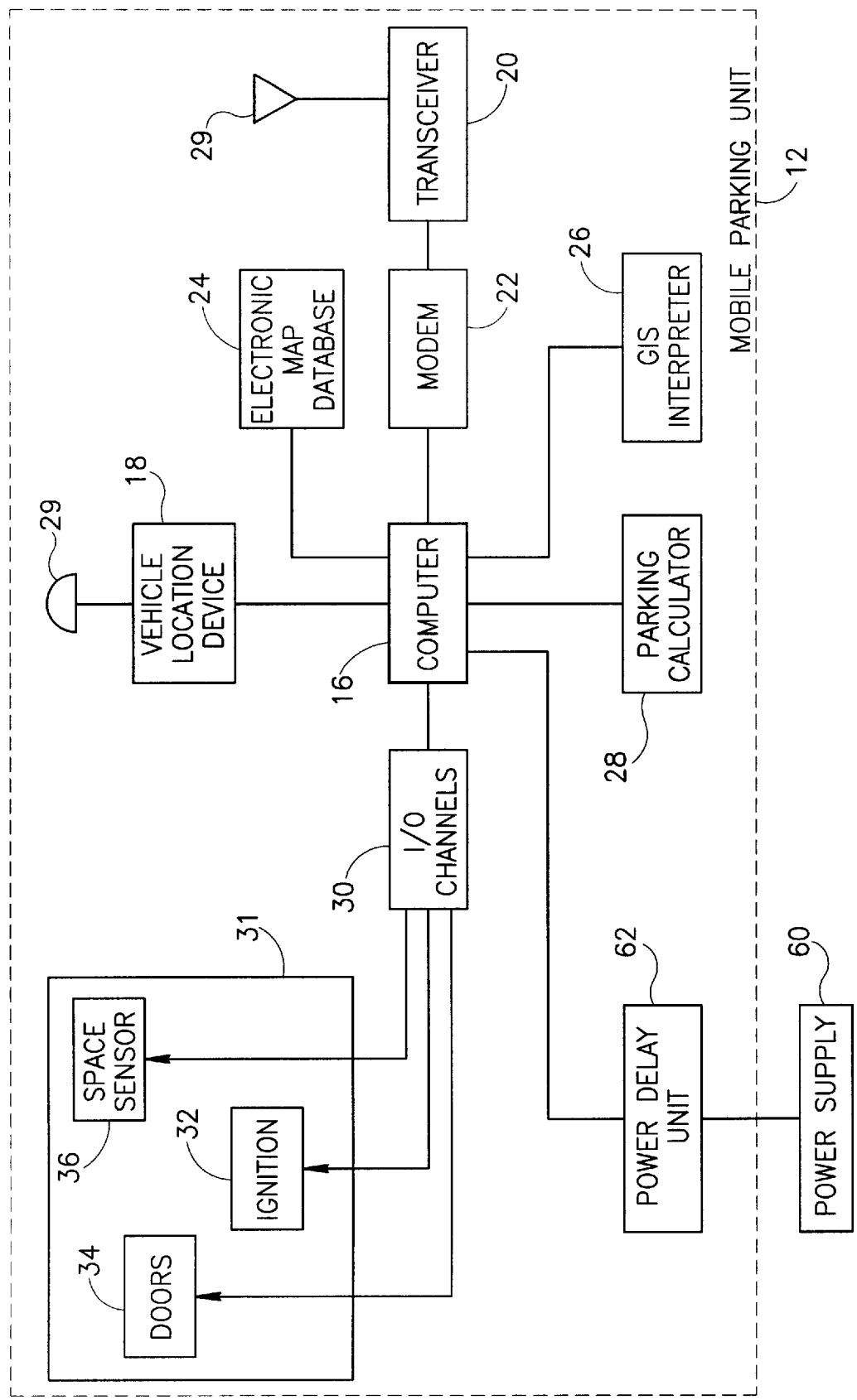
FIG. 2 is a high level block diagram illustration of the components of the mobile parking unit of the system of FIG. 1.

Reference is now made to FIG. 2, which is a high level block diagram illustration of the components of mobile parking unit 12. Mobile parking unit 12 comprises a computer 16 coupled to a vehicle location device 18, such as a Global Positioning System (GPS) receiver, and a transceiver 20 connected to a modem 22 (which is coupled to computer 16). In addition, mobile parking unit 12 further comprises an electronic map database 24, a Geographic Information System (GIS) interpreter 26 and a means for calculating the cost of parking 28, all of which are coupled to computer 16, which may be any suitable computer PC or micro-computer known in the art. A radio antenna 29 is connected to transceiver 20.

A Geographic Information System (GIS) generally comprises a plurality of databases, such as electronic map database 24 containing latitude and longitude information for every street, highway and intersection within the operational area. The electronic map database 24 can also contain any other data such as the location of parking spaces within an area and the cost parameters for each parking space, for example.

The Geographic Information System (GIS) interpreter 26 compares the vehicle location data received by the vehicle location device 18 with information stored in the electronic map database 24 to determine, for example, the vehicle location with respect to the maps in the database 24.

Mobile parking unit 12 further comprises input and output channels, generally designated 30, which can be connected to control elements of the vehicle 31, such as the ignition switch 32, the vehicle doors 34, volume (space) sensor 36, or any other suitable sensing device.

The mobile parking unit 12 is installed in the vehicle so that its display unit 44 (see FIG. 3) is visible for inspection from outside. At installation a unique identification number, such as the vehicle license plate number, for example, is assigned to the mobile parking unit 12 and stored in the non-volatile memory unit 38.

Figure 3:
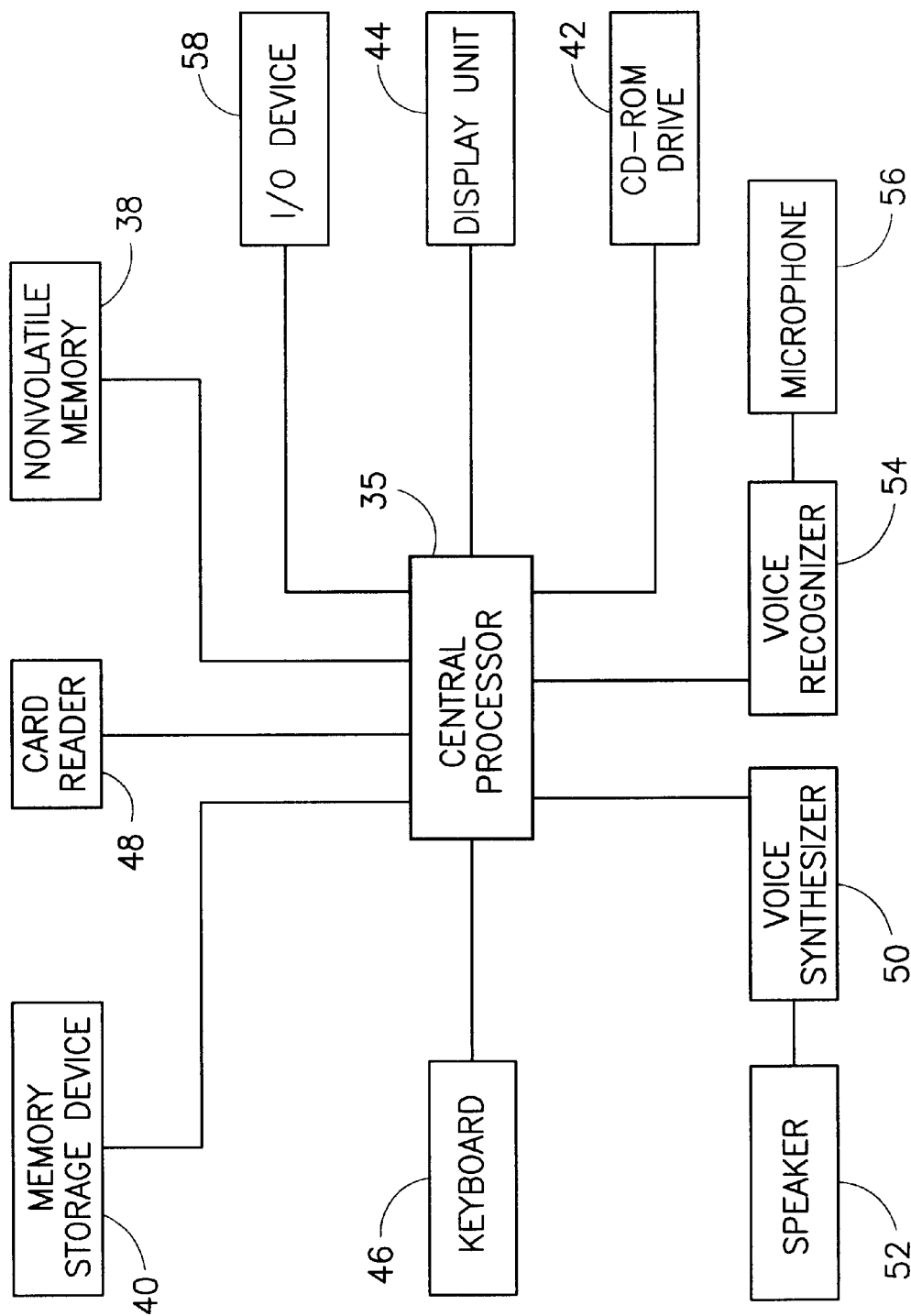
FIG. 3 which is a high level block diagram illustration of the components of computer processing unit of the mobile parking unit of FIG. 2.

Reference is now also made to FIG. 3 which is a high level block diagram illustration of the components of computer 16. Preferably, computer 16 comprises a central processor 35 and other standard components for making the computer more versatile, such as non-volatile memory 38, memory storage devices 40, such as a hard disk drive, solid state disk, and/or CD-ROM drive 42, a display unit 44, a keyboard/control panel 46.

Optionally, computer 16 further comprises a card reader 48 and/or other hardware apparatus, commercially available including a voice synthesizer 50 and speaker 52, and voice recognizer 54 with a microphone 56 for vocal interaction with the mobile parking unit 12.

Furthermore, computer 16 may comprise additional input/output devices 58, such as floppy disk drive and PCMCIA drive, known in the art.

Power is provided to mobile parking unit 12 by any suitable means such as the vehicle battery or a dedicated rechargeable battery 60. A power delay unit 62 can also be coupled to computer 16 of mobile parking unit 12.

The vehicle location device 18 can be any suitable Global Positioning System (GPS) device, known in the art such as the commercially available ACE GPS Module, manufactured by Trimble Navigation of California, USA, or alternatively any other vehicle locating device or system which provides the vehicle location within an acceptable accuracy. For the purposes of example only, and without limiting the invention in any way, reference is made to a GPS system.

Signals from the GPS satellite constellation are received by the GPS receiver 18 via GPS antenna 29. GPS receiver 18 calculates the geographic location providing a latitude, longitude and optionally elevation of its location, speed, heading and accurate time. Since GPS receiver 18 forms an integral part of mobile parking unit 12 and as the mobile parking unit 12 is installed in a vehicle 31, the position, speed and heading of the GPS receiver refer to the position, speed and heading of the vehicle.

To obtain a higher positioning accuracy, the GPS differential correction feature (known in the art), which is based on available differential correction reference stations which broadcast differential correction data, can be used. In some countries such as the USA, differential correction data is available from government agencies, and/or private companies. If differential correction data is not available, reference stations can be added to the system, as necessary. The Differential GPS (DGPS) reference station broadcasts location correction data which can be computed together with the location signal obtained by the GPS receiver to provide a more accurate (corrected) location.

The electronic map database inter alia includes geographic map data, the geographic location of each parking space in at least one specific region of operation, such as, a town, city, country or state, and attributes associated with each parking space, such as the cost of parking per unit of time, the hours, time, days (in the year) that parking is free, for example.

The central processor 35 of the computer 16 through the input and output (I/O) channels 30 senses the status of any of the elements connected thereto including at least the ignition switch 32, and optionally also the doors 34 (whether open or closed) and the volume sensor 36 (that is, whether any one is inside the vehicle), for increased reliability, if required. If the ignition switch is off, (and the doors were opened and closed and/or the volume sensor indicates that there is no one in the vehicle), the speed of the GPS receiver 18 (of the vehicle) is checked. If it is zero, or within the pre-determined range parameters of the GPS receiver 18, the central processor 35 (of the mobile parking unit 12) concludes that the vehicle is not moving and activates the GIS interpreter 26.

Alternatively, if the speed of the GPS receiver 18 (of the vehicle) is found to be zero, a check of the other components (ignition switch is off, doors are opened or closed and/or the volume sensor) is made to see whether the GIS interpreter should be activated.

Alternatively if the speed of the GPS receiver 18 of the vehicle is found to be zero for a certain of predetermined time e.g. 10 minutes, the GIS interpreter is activated.

Figure 4:
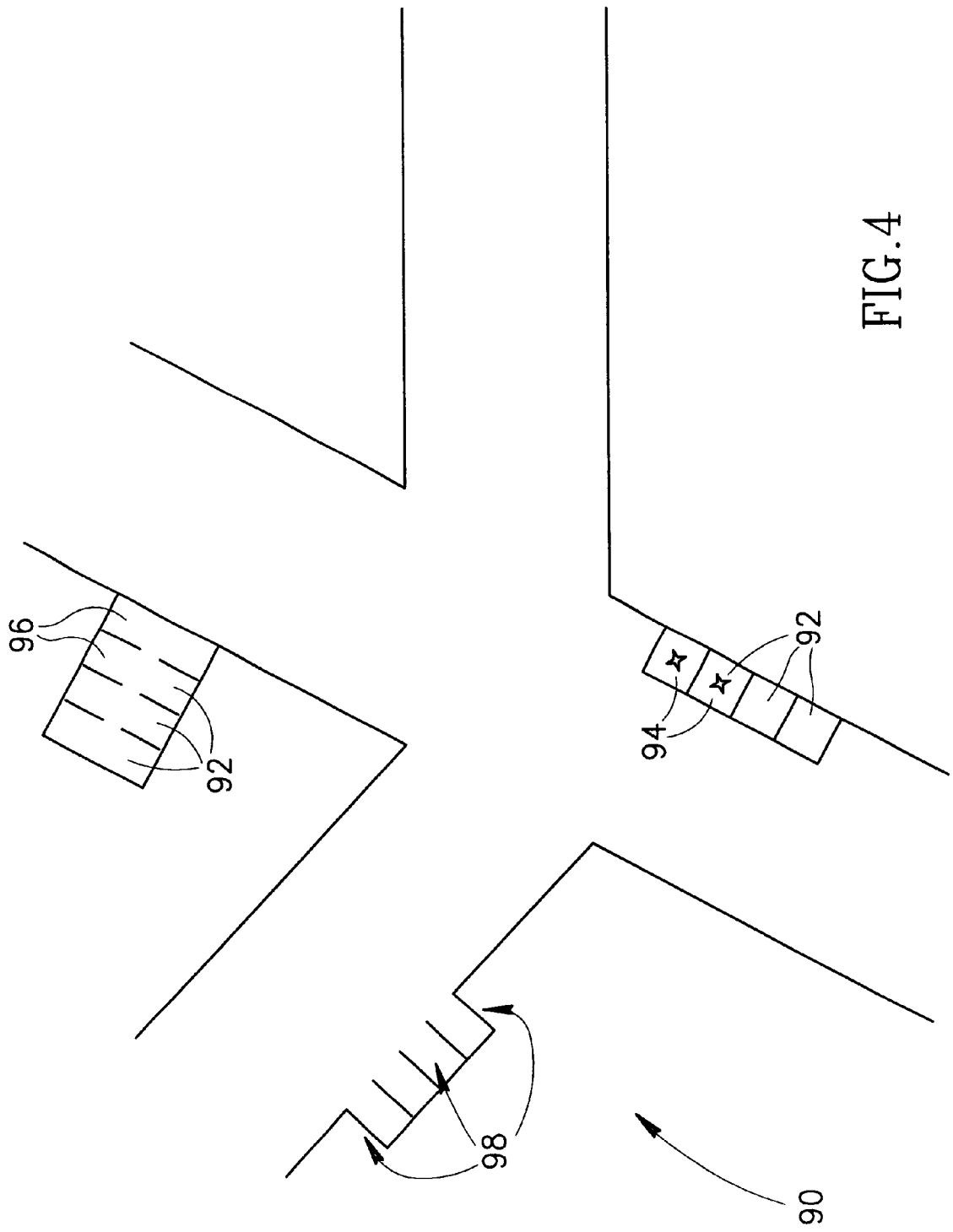
FIG. 4 is a schematic representation of a parking area.

Referring now to FIG. 4, which is a schematic representation of a parking area, generally designated 90, having a plurality of parking spaces 92. The location of a parking space 92 can be defined as the latitude, longitude and optionally elevation of the center point of the parking space, referenced by star 94, or alternatively, as the set of latitudes, longitudes and optionally elevations, of the perimeter of the parking space, indicated by lines 96, or alternatively, as the perimeter of a section of the parking lot, delineated by lines 98.

It will be appreciated by persons skilled in the art that the parking location is not limited to the examples given but may be defined by any other known method for describing a geographic location or a geographic area or a space digitally.

The database 24 of the Geographic Information System (GIS) comprises databases containing latitude and longitude information for every street, highway and intersection within the operational area. In addition, database 24 contains location of parking areas 90 within the operational area together with parameters associated with the parking spaces 92, including information related to the applicable charges for the parking spaces 92 at different periods.

The Geographic Information System (GIS) interpreter 26 compares the vehicle location as determined by the vehicle location device 18, with all the plurality of parking spaces 92 of the parking areas 90 stored in the electronic map database 24. If a match is found, that is, the vehicle location coincides with a parking space location within an acceptable accuracy of the vehicle location device 18, the mobile parking unit 12 concludes that the vehicle is parked in a defined parking space. If the specific parking space is defined as a chargeable space, then the parking charging system is activated.

The mobile parking unit 12 registers the time, (the start of parking) and displays it on the display unit 44 or otherwise indicates that parking is being charged for. Display unit 44 may be any suitable unit including but not limited to a display screen or a flashing LED indicator, for example, signaling that the mobile parking unit 12 is charging the driver for parking. The display unit 44 is used to enable a parking inspector to check parking violations.

When the driver returns to the car, the sensors connected to the control elements (such as opening the doors 34, switching on the ignition 32) of the vehicle 31 attached to input and output channels 30, activate the mobile parking unit 12 to register the time as the "end parking" time. As a further validation, a check is also made that the vehicle actually moves away from the parking space by using the vehicle location device 18 to check that the speed of the vehicle is greater than a pre-determined value, for example, 5 miles an hour, and that the vehicle location has changed and no longer matches that of the parking space where it was parked. When these conditions occur, the registered time is considered as the "end parking" time.

If the latter criteria are met, the parking charging means 28 calculates the total parking time by subtracting the end time from the beginning time and "charges" for the time the vehicle was parked in accordance with the corresponding parking charges stored in database 24 for that particular space at that particular time.

In an alternative embodiment, the mobile parking unit 12 may be activated manually to start and end the parking time for charging. In this mode, specific keys of the keyboard/control panel 46 are programmed as "begin parking" and "end parking" keys. The vehicle driver utilizes these keys to indicate the beginning and termination of parking. The mobile parking unit 12 calculates the total parking time as described hereinabove.

Figure 5:
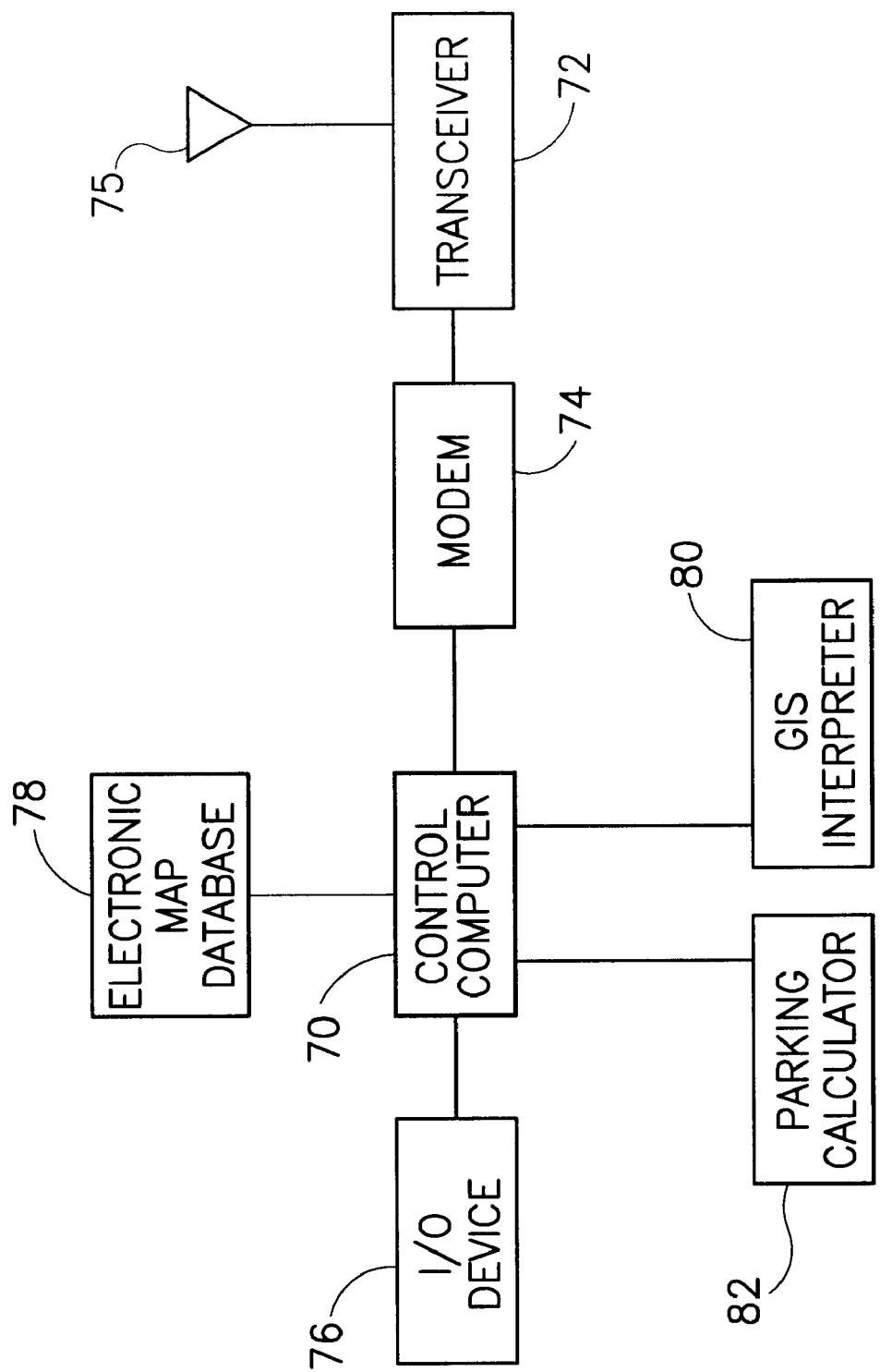
FIG. 5 which is a high level block diagram illustration of parking control center of the system of FIG. 1.

Reference is now made to FIG. 5 which is a high level block diagram illustration of parking control center 14. Parking control center 14 comprises a control computer 70, such as a PC computer, a transceiver 72 coupled to a modem 74 (which is coupled to control computer 70) and an input/output device 76. A radio antenna 75 is connected to transceiver 72.

In addition, control computer 70, which may be any suitable computer known in the art, comprises an electronic map database 78, which is similar to electronic maps database 24 described in hereinabove with reference to FIG. 2, a Geographic Information System (GIS) interpreter 80 and a means for calculating the cost of parking 82, similar to GIS interpreter 26 and parking calculator 28 (of FIG. 2).

There are several alternative methods of calculating and charging for parking time, which will now be described:

METHOD 1

Using transceiver 20, the mobile parking unit 12 transmits the calculated parking time and the location of the parking space to the parking control center 14 which then calculates the total cost of the parking, using its parking calculator 82 (FIG. 5) to calculate the cost based on the particular parking space charges and other attributes and bill the driver.

The location can be reported in a number of ways, as the specific parking space within a specific parking lot (see FIG. 4), with its full address, or as the geographic location only, (that is, the latitude and longitude and optionally the elevation) or as a predefined unique code assigned to this specific parking space. In this case, the parking control center 14, based on its map database 78 identifies the specific parking space and the parking rate from the received location and calculates the charges. An alternative form of reporting location is by reporting only the place name, or the zip code, or the town, or the city, or the state name.

METHOD 2

The mobile parking unit 12 itself calculates the parking charges using its built-in parking calculator 28. Then, via transceiver 20, the mobile parking unit 12 transmits the calculated charges and a place name only, that is, region name, zip code, town name, city name, state name to the parking control center 14. The parking control center 14 can then bill the driver, say, once a month. Alternatively, the driver pays a specific amount in advance on account to be deducted from charges reported.

At a minimum, the place name needs to be reported for proper distribution of the collected parking charges to the different proprietors, or authorities. In this way, there is a minimum violation of privacy, since only towns, and non-exact locations are reported.

METHOD 3

The mobile parking unit 12 itself calculates the parking charges using its built-in parking calculator 28. Then, via transceiver 20, the mobile parking unit 12 only transmits the calculated charges to the parking control center 14, which then bills the driver as described hereinabove. This charging method has the added advantage of total non-violation of privacy, since the mobile parking unit 12 does not reports the location of the parking space and the driver movements and parking locations cannot be traced.

METHOD 4

The mobile parking unit 12 is loaded with a prepaid amount of money, which is stored in the non-volatile memory unit 38. Each time a parking charge is incurred and calculated, as described hereinabove, the mobile parking unit 12 deducts the charged amount from the prepaid amount until all of it is used up or alternatively, a preset minimum level remains. In this method, the mobile parking unit 12 informs the driver through the display 44 of the state of his account. The driver can add to the prepaid amount at any time. If, however, the mobile unit is not replenished with additional prepaid amount and the remaining prepaid amount is reduced to the preset minimum, it will not activate the display while parking and the driver will be violating parking if parked in a charged parking space.

The loading of the prepayment to the mobile unit may be carried out as follows:

The driver pays the parking lot proprietor, relevant authorities or parking control center 14, a prepaid amount directly or indirectly. If paid directly, the parking control center 14, knowing the driver's identification No., can transmit the prepaid amount directly to the driver's mobile parking unit 12, which then stores the transmitted amount in its memory unit 38.

In an alternative embodiment, the driver can use a credit card, or other smart card, for charging his account by inserting the credit card into the card reader 48 and using the keyboard 46 to key in his credit card PIN (Personal Identification Number) and the amount he wishes to prepay. The mobile parking unit 12 then transmits the entered amount together with the driver unit's identification No. and the driver's credit card information to the parking control center 14. The parking control center 14 receives the data, stores it in its files and charges the driver account through the credit card company.

METHOD 5

This method is similar to method 4 except that the mobile parking unit 12 is autonomous. The prepaid amount charged with a credit card is verified directly with the credit card company and not through the parking control center 14. Upon insertion of the credit card to the card reader 48, the PIN (Personal Identification Number) and the amount to be prepaid using the keyboard 46, the mobile parking unit transmits the data together with the mobile parking unit 12 identification number, using transceiver 20, directly to the credit card company for credit approval of the prepaid amount as is commonly done commercially. If approved the mobile parking unit stores it in its memory as a prepaid amount. In this method the mobile parking unit is operated autonomously without the parking control center 14.

The credit card company charges the driver and transfers the payment to the parking authorities.

METHOD 6

This method is similar to method 4 except that the loading of the prepaid amount is done manually using a parking debit card which can be purchased from the proprietor of the parking space or the authorities. The purchased debit card is inserted into the card reader 48, which reads the amount stored on the debit card and stores that amount as a prepayment amount in the mobile parking unit's memory. In addition the mobile parking unit 12 after reading the amount of the debit card, stores it in its memory and deducts the equivalent amount from the debit card.

In the latter method (Method 6), mobile parking unit 12 can be operated independently without the control center 14 and without a transceiver 20. Privacy is fully protected.

METHOD 7

In an alternative method, the mobile unit 12 does not check the matching of the vehicle location with known parking space and does not calculate the parking time or the parking charges. All calculations are performed by the control center 14. The mobile unit 12 only checks if the vehicle stops. If it stops in the same location, or alternatively is stationary for a certain minimum time period, say, 5–10 minutes with the ignition off, the mobile unit 12 transmit its location and the time to the control center 14. The control center 14 then checks if the vehicle location matches any of the parking spaces and performs all the calculation described above. If the location does not match a parking space, then no charges are made. When the vehicle moves as described above, the mobile unit 12 again reports the time to the control center 14. If the location previously reported was a parking space the control center calculates the charges and bills the driver.

METHOD 8

This method is similar to any of the methods described above where prepayment is done by either a credit card or a debit card, except that the mobile unit 12 stores multiple prepayment amounts. Each such prepayment is related to a specific place, such as a town, city, county which has one common parking authority for collecting the parking charges in that specific place. If a credit card is used, the driver inserts it into the card reader 48 and using the keyboard 46 enters the place name which is then transmitted together with the other data inserted, as described in method 5 above, to the parking control center or the credit card company, depending on the method used. The control center (or the credit card company) disseminates the parking prepayments to each place authorities accordingly. The mobile parking unit or the parking control center, depending on the method used, knowing the place/location of the parking space in which the vehicle is parked charges the appropriate prepayment of that place.

If a debit card is used, it will also include, in its stored data, the place name where it can be used. Multiple debit cards can be purchased, one for each place, and be inserted to the mobile parking unit 12 using the card reader 48. The mobile parking unit 12 then stores all prepayments with their corresponding place name for appropriate charging as with the credit card multiple prepayments described above.

In all methods described hereinabove, the electronic map database 28 can be transferred to the mobile parking unit 12 by conventional means, such as a floppy disk, a PCMCIA card, a CD-ROM or other removable media for reading by the corresponding input device 58 of the mobile parking unit 12.

Alternatively, the electronic map database 28 can be transferred to the mobile parking unit 12 by wireless communication from the parking control center 14. The parking control center 14 transmits, on request, the relevant data base to the mobile parking unit 12 which receives the data and stores it in its memory storage unit 40. The request can be activated manually by the driver or automatically by the mobile parking unit 12.

When a driver is driving from one city to the other or from one state/country to the other and he does not have the corresponding electronic map database, he can either purchase it on a removable media as described above and download it to the mobile parking unit 12 or request that it be transmitted to his mobile parking unit 12 from the parking control center 14. A manual request can be executed by activating a "request to download electronic map database" key on the control panel 46. Activating this key generates the transmission of the vehicle mobile unit identification and the vehicle location. The parking control center 14 receiving the message verifies the vehicle identification, checks the location of the vehicle and transmits back to it the electronic map data base of that area.

The automatic request which is generated automatically by the mobile parking unit 12 is carried out as follows:

Since, the mobile parking unit 12 knows the vehicle location at all times, it can intermittently check its location versus the electronic map database stored in memory, to determine whether or not it is within the map database coverage. If not it can generate a request for a new map database.

However, since a vehicle might cross regions in which it does not have any intention of parking in, the mobile parking unit 12 only generates a request for downloading a new map database when the vehicle is parked. In the process of searching for a match between the vehicle location and a chargeable parking space, the GIS software first checks if the vehicle location is at all within the area covered by the stored electronic map database 24. If it is, it starts searching for a match. If not, the mobile parking unit 12 generates a request for a map database of that area by transmitting a request message with its identification No., and its location to the parking control center 14. The parking control center 14 upon receiving the requested message, verifies the vehicle identification and if valid checks the location of the vehicle and transmits back to it the electronic map data base covering the vehicle location area. The mobile parking unit 12 receiving the transmitted map database stores it in memory unit 40. The reported location can be the actual location or where privacy protection is important, other minimalist data which can indicate the location such as the zip code or place name, as described above.

To enable continuous operation of the mobile unit while parking and with ignition switch off, the mobile parking unit 12 must be continuously connected to a power source 60. Alternative power sources 60 include direct connection to the vehicle battery, an independent rechargeable battery installed in the mobile parking unit or a power delay unit 62 which is a power delay timer installed between the mobile parking unit 12 and the ignition key 32. Power delay timers are standard components available in the market. They are available for different range of delay times up to tens of hours. The power delay unit maintains power to the mobile unit for as many hours as the timer was set for starting from the time the ignition switch is switched off.

It will be further appreciated by persons skilled in the art that the present invention is not limited to what has been particularly shown and described hereinabove. Rather the scope of the present invention is defined only by the claims which follow.

What is claimed is:

1. A system for charging for vehicle parking, comprising:
   a plurality of mobile parking units, each of said plurality of mobile parking units installed in a vehicle and having an unique identification; and
   a parking control center for communicating with each of said mobile parking units,
   input and output channels connected to at least one of a group of control elements including the vehicle ignition switch, the vehicle doors and volume (space) sensor, said control elements indicating whether or not the vehicle is immobile,
   wherein each of said plurality of mobile parking units, checks its location whenever the vehicle is not moving and if the location coincides with a known parking area, charging for parking is activated until the vehicle resumes traveling, and
   wherein each of said plurality of mobile parking units further comprises:
   an electronic map database containing at least the geographic location of parking spaces in at least one specific region of operation;
   a Geographic Information System (GIS) interpreter for interpreting the data within said electronic map database; and
   a means for calculating the cost of parking.

2. A system for charging for vehicle parking, comprising:
   a plurality of mobile parking units, each of said plurality of mobile parking units installed in a vehicle and having an unique identification; and
   a parking control center for communicating with each of said mobile parking units,
   wherein each of said plurality of mobile parking units, checks its location whenever the vehicle is not moving and if the location coincides with a known parking area, charging for parking is activated until the vehicle resumes traveling;
   wherein each of said plurality of mobile parking units comprises:
   a vehicle location device for determining the geographic location and speed of each of said plurality of mobile parking units;
   a transceiver connected to a modem, for communicating with said parking control center; and
   a computer unit for coupling to said vehicle location device and said transceiver; and
   wherein said computer unit comprises;
   a central processor; and
   a smart card reader coupled to said central processor, and
   input/output (I/O) channels coupled to said central processor, said input channels having at least one sensing elements connected thereto, said sensing elements indicating whether or not the vehicle is immobile.

3. A system according to claim 2, wherein said at least one sensing elements comprise at least one of a group of sensors connected to the vehicle ignition switch, the vehicle doors and the internal volume of the vehicle.

4. A system for charging for vehicle parking, comprising:
   a plurality of mobile parking units, each of said plurality of mobile parking units installed in a vehicle and having an unique identification; and
   a parking control center for communicating with each of said mobile parking units,
   wherein each of said plurality of mobile parking units, checks its location whenever the vehicle is not moving and if the location coincides with a known parking area, charging for parking is activated until the vehicle resumes traveling; wherein said parking control center comprises:
   a control computer; and
   a transceiver coupled to a modem which is coupled to said control computer,
   and wherein said computer unit further comprises input/output (I/O) channels coupled to said central processor, said input channels having at least one sensing elements connected thereto, said sensing elements indicating whether or not the vehicle is immobile.

5. A system according to claim 4 wherein said parking control center further comprises:
   an electronic map database containing at least the geographic location of parking spaces in at least one specific region of operation;
   a Geographic Information System (GIS) interpreter for interpreting the data within said electronic map database; and
   a means for calculating the cost of parking.

6. A system according to claim 5, wherein said electronic map database further containing data associated with each of said parking spaces.

7. A method for charging for vehicle parking comprising the steps of:
   recording the time and location whenever the vehicle is immobile;
   if the location coincides with a known parking area, calculating the parking charges for the total period of time said vehicle remains immobile;
   and transmitting said recorded time and location to a central processor over input/output channels coupled to said central processor,
   wherein said input channels having at least one sensing elements connected thereto, said sensing elements indicating whether or not the vehicle is immobile.

8. A method according to claim 7 and further comprising the step of displaying an indication that parking is being charged for.

9. A method according to claim 7 and further comprising the step of identifying the geographic location and speed of said vehicle.

10. A method according to claim 7 and wherein said vehicle comprises a mobile parking unit installed therein.

11. A method according to claim 10 wherein the step of recording the time and location comprises the step of the vehicle owner manually entering at least one of said time and location into said mobile parking unit.

12. A method according to claim 10 wherein said mobile parking unit comprises a non-volatile memory unit for storing a prepaid monetary value for parking.

13. A method according to claim 12 and comprising the step of said control center transmitting said prepaid monetary value to the non-volatile memory unit of said mobile parking unit.

14. A method according to claim 12 wherein said mobile parking unit comprises a card reader and a keyboard and comprising the step of the vehicle owner using a credit card in said card reader and entering the prepaid monetary value to be entered into said non-volatile memory unit by means of said keyboard.

15. A method according to claim 14 and further comprising the step of said mobile parking unit transmitting said entered amount to said control center.

16. A method according to claim 14 and further comprising the step of the vehicle owner entering the parking location by means of said keyboard.

17. A method according to claim 16 and further comprising the step of said mobile parking unit transmitting said parking location to said control center.

18. A method according to claim 16 and further comprising the steps of:
   said mobile parking unit transmitting said parking location to a credit card company; and
   said credit card company debiting the monetary value corresponding to the parking charges for said parking location.

19. A method according to claim 14 and further comprising the steps of:
   said mobile parking unit transmitting said entered amount to a credit card company for credit approval; and
   if credit is approved, said mobile parking unit storing the prepaid monetary value into said non-volatile memory unit.

20. A method according to claim 12 wherein said mobile parking unit comprises a card reader and a keyboard and comprising the step of the vehicle owner using a debit card in said card reader and entering the prepaid monetary value to be entered into said non-volatile memory unit by means of said keyboard.

21. A method according to claim 7 and further comprising the step of using a vehicle location device installed in said vehicle for determining the geographic location and speed of each of said vehicles.

22. A method according to claim 21 wherein said vehicle location device is contained within said mobile parking unit.

23. A method according to claim 7 wherein the step of calculating comprises the step of:
   comparing said geographic location with an electronic map database containing the location of parking spaces in the region of operation; and
   calculating the cost of parking for said geographic location according to the cost of parking per unit of said immobile time for said parking space.

24. A method according to claim 23 wherein said calculating step is performed by said mobile parking unit.

25. A method according to claim 24 wherein said calculating step further comprises the step of:
   said mobile parking unit communicating the calculated charges to a remote control center.

26. A method according to claim 25 wherein said calculating step further comprises the step of:
   said mobile parking unit communicating the location of said vehicle to said remote control center.

27. A method according to claim 25 wherein said remote control center bills the vehicle owner for said calculated parking charges.

28. A method according to claim 7 wherein said calculating step is performed by said mobile parking unit and said calculating step comprises the steps of:
   said mobile parking unit comparing said geographic location with an electronic map database containing the location of parking spaces in the region of operation and communicating the parking time and the parking location of said vehicle to said remote control center; and
   said remote control center calculating the parking charges.

29. A method according to claim 7 wherein the step of calculating comprises the step of:
   said mobile parking unit communicating the parking time and location to said control center; and
   said control center comparing said geographic location with an electronic map database containing the location of parking spaces in the region of operation; and
   said control center calculating the cost of parking for said geographic location according to the cost of parking per unit of said immobile time for said parking space.

30. A method for charging for vehicle parking comprising the steps of:
   recording the time and location whenever the vehicle is immobile;
   and if the location coincides with a known parking area, calculating the parking charges for the total period of time said vehicle remains immobile,
   wherein said step of recording the time of the vehicle's immobility further comprises at least one of the steps of:
   recording the time said vehicle's ignition is switched off;
   recording the time the vehicle's doors are opened and closed; and recording the time the volume within the vehicle is disturbed.

31. A method for charging for vehicle parking comprising the steps of:
   recording the time and location whenever the vehicle is immobile;
   and if the location coincides with a known parking area, calculating the parking charges for the total period of time said vehicle remains immobile,
   non-volatile memory unit of a mobile parking unit stores a plurality of prepaid monetary values for different parking locations,
   wherein said mobile parking unit is comprised in said vehicle;
   wherein said non-volatile memory unit is comprised in said mobile parking unit for storing a prepaid monetary value for parking; and
   wherein said mobile parking unit comprises a card reader and a keyboard and comprising the step of the vehicle owner using a debit card in said card reader and entering the prepaid monetary value to be entered into said non-volatile memory unit by means of said keyboard.

32. A method for charging for vehicle parking comprising the steps of:
   recording the time and geographic location whenever the vehicle is immobile;
   if the location coincides with a known parking area, calculating the parking charges for the total period of time said vehicle remains immobile, and
   transferring an electronic map database to a mobile parking unit by any of a group of removable media including floppy disk, a PCMCIA card, CD-ROM and DVD-ROM,
   wherein said mobile parking unit is installed in said vehicle, and said electronic map database is installed in said mobile parking unit;
   wherein the step of calculating comprises the step of:
      comparing said geographic location with an electronic map database containing the location of parking spaces in the region of operation; and
      calculating the cost of parking for said geographic location according to the cost of parking per unit of said immobile time for said parking space.

33. A method for charging for vehicle parking comprising the steps of:
   recording the time and geographic location whenever the vehicle is immobile;
   if the location coincides with a known parking area, calculating the parking charges for the total period of time said vehicle remains immobile, and
   transmitting an electronic map database to a mobile parking unit from a control center,
   wherein the step of calculating comprises the step of:
      comparing said geographic location with said electronic map database containing the location of parking spaces in the region of operation; and
      calculating the cost of parking for said geographic location according to the cost of parking per unit of said immobile time for said parking space, and
   wherein said mobile parking unit is comprised in said vehicle, and said electronic map database is comprised in said mobile parking unit.

34. A method according to claim 33 wherein said transmission comprises the step of the vehicle user requesting said transmission.

35. A method according to claim 33 wherein said transmission comprises the step of said mobile parking unit requesting said transmission whenever said vehicle is immobile and is located within a region for which a map database is not stored.

36. A mobile parking unit for installation in a vehicle comprising:
   a vehicle location device for determining the geographic location and speed of said mobile parking unit;
   a transceiver connected to a modem, for communicating with said parking control center; and
   a computer unit for coupling to said vehicle location device and said transceiver, wherein said computer unit further comprises input/output (I/O) channels coupled to said central processor, said input channels having at least one sensing elements connected thereto, said sensing elements indicating whether or not the vehicle is immobile.

37. A mobile parking unit according to claim 36, wherein said computer unit comprises:
   a central processor; and
   a smart card reader coupled to said central processor.

38. A mobile parking unit according to claim 36, wherein said mobile parking unit further comprises:
   an electronic map database containing at least the geographic location of parking spaces in at least one specific region of operation;
   a Geographic Information System (GIS) interpreter for interpreting the data within said electronic map database; and
   a means for calculating the cost of parking.

39. A mobile parking unit according to claim 38, wherein said electronic map database further contains data associated with each of said parking spaces.

40. A mobile parking unit according to claim 39, wherein said cost of parking is determined by said calculating means in accordance with said geographic location of said mobile parking unit and the time for which each of said mobile parking unit is immobile.

41. A mobile parking unit according to claim 36, wherein mobile parking unit further comprises an indication unit for displaying an indication that parking is being charged for.

42. A mobile parking unit according to claim 36, wherein said vehicle location device comprises a Global Positioning System (GPS) receiver having an antenna coupled thereto.

43. A mobile parking unit according to claim 36, wherein said at least one sensing elements comprise at least one of a group of sensors connected to the vehicle ignition switch, the vehicle doors and the internal volume of the vehicle.

44. A mobile parking unit for installation in a vehicle comprising:
   a vehicle location device for determining the geographic location and speed of said mobile parking unit;
   a transceiver connected to a modem, for communicating with said parking control center; and
   a computer unit for coupling to said vehicle location device and said transceiver,
   wherein said mobile parking unit further comprises:
      an electronic map database containing at least the geographic location of parking spaces in at least one specific region of operation;
      a Geographic Information System (GIS) interpreter for interpreting the data within said electronic map database;
      a means for calculating the cost of parking; and input and output channels connected to at least one of a group of control elements including the vehicle ignition switch, the vehicle doors and volume (space) sensor, said control elements indicating whether or not the vehicle is immobile.

45. A system for charging for vehicle parking, comprising:
   a plurality of mobile parking units, each of said plurality of mobile parking units installed in a vehicle and having an unique identification; and
   a parking control center for communicating with each of said mobile parking units,
   wherein each of said plurality of mobile parking units, checks its location whenever the vehicle is not moving and if the location coincides with a known parking area, charging for parking is activated until the vehicle resumes traveling, and
   wherein each of said plurality of mobile parking units further comprises:
      an electronic map database containing at least the geographic location of parking spaces in at least one specific region of operation;
      a Geographic Information System (GIS) interpreter for interpreting the data within said electronic map database;
      a means for calculating the cost of parking; and
      input and output channels connected to at least one of a group of control elements including the vehicle ignition switch, the vehicle doors and volume (space) sensor, said control elements indicating whether or not the vehicle is immobile.

46. A system for charging for vehicle parking, comprising:
   a plurality of mobile parking units, each of said plurality of mobile parking units installed in a vehicle and having an unique identification; and
   a parking control center for communicating with each of said mobile parking units,
   wherein each of said plurality of mobile parking units, checks its location whenever the vehicle is not moving and if the location coincides with a known parking area, charging for parking is activated until the vehicle resumes traveling, and
   wherein each of said plurality of mobile parking units comprises:
      a vehicle location device for determining the geographic location and speed of each of said plurality of mobile parking units;
      a transceiver connected to a modem, for communicating with said parking control center; and
      a computer unit for coupling to said vehicle location device and said transceiver, said computer unit comprising:
         a central processor;
         a smart card reader coupled to said central processor; and
         an input/output (I/O) channels coupled to said central processor, said input channels having at least one sensing elements connected thereto, said sensing elements indicating whether or not the vehicle is immobile.

47. A system according to claim 46, wherein said at least one sensing elements comprise at least one of a group of sensors connected to the vehicle ignition switch, the vehicle doors and the internal volume of the vehicle.

48. A method for charging for vehicle parking comprising:
   recording the time and location whenever the vehicle is immobile; and if the location coincides with a known parking area, calculating the parking charges for the total period of time said vehicle remains immobile;
   wherein said recording the time of the vehicle's immobility further comprises at least one of the steps of:
      recording the time said vehicle's ignition is switched off;
      recording the time the vehicle's doors are opened and closed; and
      recording the time the volume within the vehicle is disturbed.

49. A method for charging for vehicle parking comprising:
   recording the time and location whenever the vehicle is immobile;
   and if the location coincides with a known parking area, calculating the parking charges for the total period of time said vehicle remains immobile;
   wherein said vehicle comprises a mobile parking unit installed therein;
   wherein said mobile parking unit comprises:
      a non-volatile memory unit for storing a prepaid monetary value for parking; and
      a card reader and a keyboard; and
   wherein the vehicle owner using a debit card in said card reader and entering the prepaid monetary value to be entered into said non-volatile memory unit by means of said keyboard; and
   wherein said non-volatile memory unit of said mobile parking unit stores a plurality of prepaid monetary values for different parking locations.

50. A method for charging for vehicle parking comprising:
   recording the time and location whenever the vehicle is immobile;
   and if the location coincides with a known parking area, calculating the parking charges for the total period of time said vehicle remains immobile;
   wherein said calculating comprises:
      comparing said geographic location with an electronic map database containing the location of parking spaces in the region of operation; and
      calculating the cost of parking for said geographic location according to the cost of parking per unit of said immobile time for said parking space; and
   further comprising transferring said electronic map database to said mobile parking unit by any of a group of removable media including floppy disk, a PCMCIA card, CD-ROM and DVD-ROM.

51. A method for charging for vehicle parking comprising:
   recording the time and location whenever the vehicle is immobile;
   and if the location coincides with a known parking area, calculating the parking charges for the total period of time said vehicle remains immobile;
   wherein said calculating comprises:
      comparing said geographic location with an electronic map database containing the location of parking spaces in the region of operation; and
      calculating the cost of parking for said geographic location according to the cost of parking per unit of said immobile time for said parking space; and
   said control center transmitting said electronic map database to said mobile parking unit.

52. A method according to claim 51 wherein said transmission comprises the step of the vehicle user requesting said transmission.

53. A method according to claim 51 wherein said transmission comprises the step of said mobile parking unit requesting said transmission whenever said vehicle is immobile and is located within a region for which a map database is not stored.

54. A mobile parking unit for installation in a vehicle comprising:
- a vehicle location device for determining the geographic location and speed of said mobile parking unit;
- a transceiver connected to a modem, for communicating with said parking control center;
- a computer unit for coupling to said vehicle location device and said transceiver;
- an electronic map database containing at least the geographic location of parking spaces in at least one specific region of operation;
- a Geographic Information System (GIS) interpreter for interpreting the data within said electronic map database;
- a means for calculating the cost of parking; and
- input and output channels connected to at least one of a group of control elements including the vehicle ignition switch, the vehicle doors and volume (space) sensor, said control elements indicating whether or not the vehicle is immobile.

55. A mobile parking unit for installation in a vehicle comprising:
- a vehicle location device for determining the geographic location and speed of said mobile parking unit;
- a transceiver connected to a modem, for communicating with said parking control center;
- a computer unit for coupling to said vehicle location device and said transceiver;
- an electronic map database containing at least the geographic location of parking spaces in at least one specific region of operation;
- a Geographic Information System (GIS) interpreter for interpreting the data within said electronic map database; and
- a means for calculating the cost of parking;
- wherein said computer unit further comprises input/output (I/O) channels coupled to said central processor, said input channels having at least one sensing elements connected thereto, said sensing elements indicating whether or not the vehicle is immobile.

56. A mobile parking unit according to claim 55, wherein said at least one sensing elements comprise at least one of a group of sensors connected to the vehicle ignition switch, the vehicle doors and the internal volume of the vehicle.

* * * * *